(12) United States Patent
Vasekin et al.

(10) Patent No.: US 7,877,587 B2
(45) Date of Patent: Jan. 25, 2011

(54) BRANCH PREDICTION WITHIN A MULTITHREADED PROCESSOR

(75) Inventors: Vladimir Vasekin, Waterbeach (GB);
Stuart David Biles, Little Thurlow (GB); Yuri Levdik, Cherry Hinton (GB); Andrei Kapustin, Cambridge (GB)

(73) Assignee: ARM Limited, Cambridge (GB)

( * ) Notice: Subject to any disclaimer, the term of this patent is extended or adjusted under 35 U.S.C. 154(b) by 480 days.

(21) Appl. No.: 11/449,858

(22) Filed: Jun. 9, 2006

(65) Prior Publication Data
US 2007/0288735 A1    Dec. 13, 2007

(51) Int. Cl.
G06F 7/38    (2006.01)
G06F 9/00    (2006.01)
G06F 9/44    (2006.01)
G06F 15/00   (2006.01)

(52) U.S. Cl. ...................................... 712/240
(58) Field of Classification Search ............ 712/240
See application file for complete search history.

(56) References Cited

U.S. PATENT DOCUMENTS
2004/0215720 A1 * 10/2004 Alexander et al. .......... 709/204

OTHER PUBLICATIONS

Ramsay et al.; Exploring Efficient SMT Branch Predictor Design; Jun. 2003; ISCA '03.*
McFarling; Combining Branch Predictors; 1993.*

* cited by examiner

*Primary Examiner*—Eddie P Chan
*Assistant Examiner*—Corey Faherty
(74) *Attorney, Agent, or Firm*—Nixon & Vanderhye P.C.

(57) ABSTRACT

A branch prediction mechanism 16, 18 within a multi-threaded processor having hardware scheduling logic 6, 8, 10, 12 uses a shared global history table 18 which is indexed by respective branch history registers 20, 22 for each program thread. Different mappings are used between preceding branch behavior and the prediction value stored within respective branch history registers 20, 22. These different mappings may be provided by inverters placed into the shift in paths for the branch history registers 20, 22 or by adders 40, 42 or in some other way. The different mappings help to equalise the probability of use of the particular storage locations within the global history table 18 such that the plurality of program threads are not competing excessively for the same storage locations corresponding to the more commonly occurring patterns of preceding branch behavior.

9 Claims, 5 Drawing Sheets

BRANCH PREDICTION WITHIN A MULTITHREADED PROCESSOR

BACKGROUND OF THE INVENTION

1. Field of the Invention

This invention relates to multithreaded processors of the type having a hardware scheduling mechanism for interleaving execution of program instructions from a plurality of program threads. More particularly, this invention relates to the efficient provision of a branch prediction mechanism within such multithreaded processors.

2. Description of the Prior Art

It is known to provide multithreaded processors in which program instructions from a plurality of program threads are interleaved for execution by a hardware scheduling mechanism. Such techniques are useful in improving the overall performance of a processor since while each thread may execute more slowly than if it had exclusive use of the processor resources, the combined processing performed by all threads normally exceeds that which could be achieved in a single thread. By executing multiple threads it is possible when one thread is stalled (such as due to a data interlock or a memory abort) for another thread to continue processing and utilise what would otherwise be unused processor cycles.

Another technique used within high performance processors is a branch prediction mechanism. In a highly pipelined processor program instructions are fetched from memory and start progressing along the instruction pipeline prior to it being determined whether or not a conditional branch instruction will or will not be taken. Such conditional branch behaviour changes the program flow and accordingly the sequence of instructions which should be fetched following that conditional branch instruction. In order to reduce the probability of incorrect instructions being fetched, it is known to provide mechanisms which seek to predict whether or not a particular conditional branch instruction will or will not result in the branch being taken or not taken. Various techniques exist for performing such branch prediction.

One known technique of branch prediction is to use a history register which stores a pattern indicating the behaviour of previously encountered conditional branch instructions, i.e. whether those branch instructions were taken or not taken. That stored pattern can then be used as an index into a history table which stores a prediction associated with each pattern of preceding branch behaviour. It is found that there is a strong correlation between preceding branch behaviour and a prediction which can be made for a newly encountered conditional branch instruction. A particular path through a program will have a distinctive pattern of preceding branch behaviour and there is a strong correlation between the branch outcome during successive such paths through a program whereby previous branch behaviour can be noted and used to generate a prediction associated with that previous pattern of branch behaviour as represented by the history register value.

In the context of multithreaded processors, the behaviour of the different program threads with respect to their preceding branch behaviour and branch prediction will be substantially independent such that a particular pattern of preceding branch behaviour for one thread will have one predicted behaviour associated with it whereas the same preceding pattern of branch behaviour for another thread could have a quite different and independent predicted behaviour. One solution to this problem would be to provide separate history tables for storing the predicted behaviour and indexed by separate history values representing preceding branch behaviour. However, the provision of separate history tables is inefficient in terms of gate count, circuit area, power consumption, cost etc.

Another solution would be to make the different threads share a common global history table and rely upon the history register values for one thread being unlikely to correspond to the history register values for another thread and accordingly the predictions for those two threads not competing for the same prediction values storage location within the shared global history table. While this might seem a reasonable approach since the branch predictions are in any case not perfect and significant numbers of mispredictions do arise with the consequent existing provision of mechanisms for recovering from such mispredictions, a further problem is that in practice some forms of preceding branch behaviour are statistically more common than others, e.g. it has been observed that taken branches represent approximately 70% of the real life total with non taken branches representing approximately 30% of the real life total. Accordingly, multiple program threads in practice compete to use the more popular index locations within such a shared global history table making the undesired overwriting of one prediction with a different prediction from a different thread more common than it might be considered purely from the size of the global history table.

SUMMARY OF THE INVENTION

Viewed from one aspect the present invention provides apparatus for processing data, said apparatus comprising:

a multithreaded processor having a hardware scheduling mechanism for interleaving execution of program instructions from a plurality of program threads; and a branch prediction mechanism having:

(i) a plurality of branch history registers each storing a prediction index that is a representation of preceding branch behaviour for a respective program thread of said plurality of program threads;

(ii) a global history table shared between said plurality of program threads and having a plurality of storage locations storing predictions of branch behaviour, said plurality of storage locations being indexed in dependence upon a prediction index for a currently active program thread; and (iii) mapping logic providing different mappings for different program threads between storage locations of predictions within said plurality of storage locations and preceding branch behaviour represented by respective prediction indices.

The present technique recognises the above problem of certain patterns of branch behaviour being more common than others resulting in threads competing more strongly for storage locations within a shared global history table and provides the solution of using different mappings for different threads between storage locations used for predictions and the preceding branch behaviour. Thus, the use of different mappings is able to reduce the competition for storage locations corresponding to the most statistically probable branch behaviour patterns since these patterns will map to different storage locations by virtue of the different mappings applied for each program thread.

The utilisation of the shared global history table can be further enhanced by arranging that the mapping performed by the mapping logic is such that a probability of use of each of the plurality of storage locations, when summed for all of the plurality of program threads, is substantially uniform between the plurality of storage locations. Thus, the statistical biases which make some branch behaviours more common than others can at least to some extent be compensated for by the mappings employed such that the probability of use of an individual storage location is substantially constant across the storage locations whereby the program threads do not excessively compete for particular storage locations.

It is preferred that the mapping logic provides a one-to-one mapping between preceding branch behaviour and prediction index for each of the plurality of program threads. This stops the program threads competing within themselves for storage locations within the global history table.

Furthermore, the spreading out of the storage locations used for a particular branch behaviour pattern occurring in different program threads is enhanced when such branch behaviour is mapped into different prediction indicies for those different program threads.

It will be appreciated that the mappings employed could take a wide variety of different forms meeting the above discussed conditions and perform advantageously over the prior art. Example forms of mapping which are particularly simple to implement are ones in which the mapping logic maps a given preceding branch behaviour in to respective different preceding indicies, such that each prediction index has an individual pattern of bit inversions with respect to all other of the prediction indicies. Another simple to implement mapping is one in which the mapping logic adds a different offset to each prediction index stored in a respective one of the plurality of branch history registers.

Viewed from another aspect the present invention provides a method of processing data, said method comprising the steps of:
  interleaving execution of program instructions from a plurality of program threads using a hardware scheduling mechanism controlling a multithreaded processor; and
  predicting branch behaviour by:
    (i) storing a prediction index that is a representation of preceding branch behaviour for a respective program thread of said plurality of program threads within a respective one of a plurality of branch history registers;
    (ii) storing predictions of branch behaviour within a global history table shared between said plurality of program threads and having a plurality of storage locations, said plurality of storage locations being indexed in dependence upon a prediction index for a currently active program thread; and
    (iii) performing different mappings for different program threads between storage locations of predictions within said plurality of storage locations and preceding branch behaviour represented by respective prediction indices.

Viewed from a further aspect the present invention provides apparatus for processing data, said apparatus comprising:
  multithreaded processor means having hardware scheduling means for interleaving execution of program instructions from a plurality of program threads; and
  branch prediction means having:
    (i) a plurality of branch history register means each for storing a prediction index that is a representation of preceding branch behaviour for a respective program thread of said plurality of program threads;
    (ii) a global history table means shared between said plurality of program threads and having a plurality of storage locations for storing predictions of branch behaviour, said plurality of storage locations being indexed in dependence upon a prediction index for a currently active program thread; and
    (iii) mapping means for providing different mappings for different program threads between storage locations of predictions within said plurality of storage locations and preceding branch behaviour represented by respective prediction indices.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
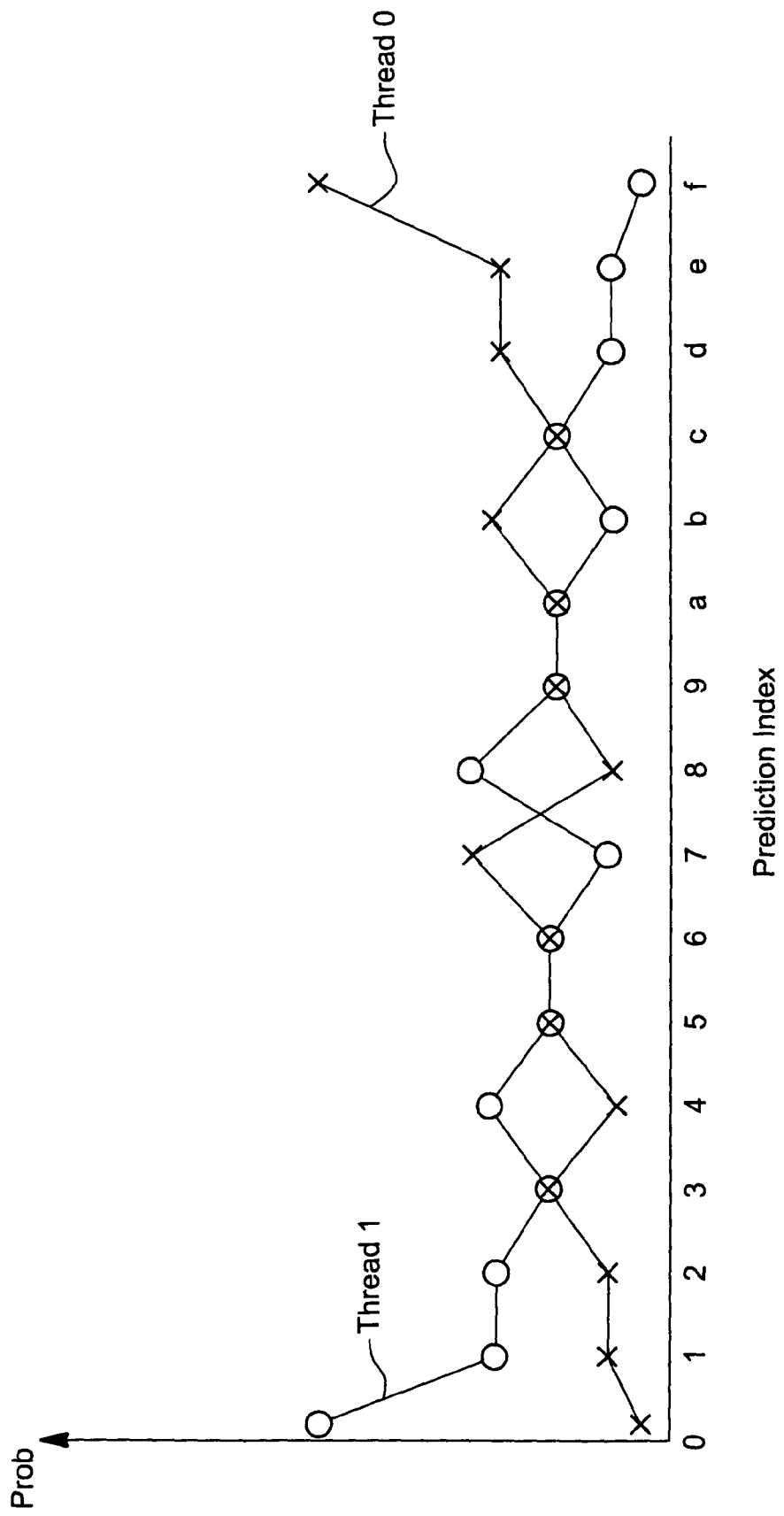
FIG. 1 schematically illustrates a simplified example showing the probability of occurrence of a particular prediction index for two threads within a multithreaded processor using different mappings between the branch behaviour and the prediction index for those different threads.

FIG. 1 is a diagram schematically illustrating the relative probability of occurrence of patterns of preceding branch behaviour (in this example four preceding branches) for two different threads within a multithreaded processor. These threads utilise different mappings between the preceding branch behaviour and the prediction index which represents that branch behaviour and which will be used to index into a shared global history table. For Thread 0 the mapping is that a taken branch is represented by a bit "1". For Thread 1 the mapping is that a taken branch is represented by a bit "0". As taken branches are most common, it will be seen that the prediction index corresponding to "1111" for Thread 0 is most common, whereas the corresponding prediction index representing the same pattern of preceding branch behaviour but utilising a different mapping maps to the prediction index (0000) for Thread 1. This inversion of the representation of branch behaviour within the prediction index stored in respective history registers is sufficient to produce the advantage of avoiding the two threads competing for the same storage location to represent a sequence of four preceding taken branches. The overall effect results in a probability of use for any given storage location that is substantially common (or at least has reduced variation) across storage locations when summed across all threads. It will be appreciated that this substantially common probability of use is not mathematically exact and there will be some variation within this, but it is common to the extent that it is improved over systems in which no such mapping differences are employed.

Figure 2:
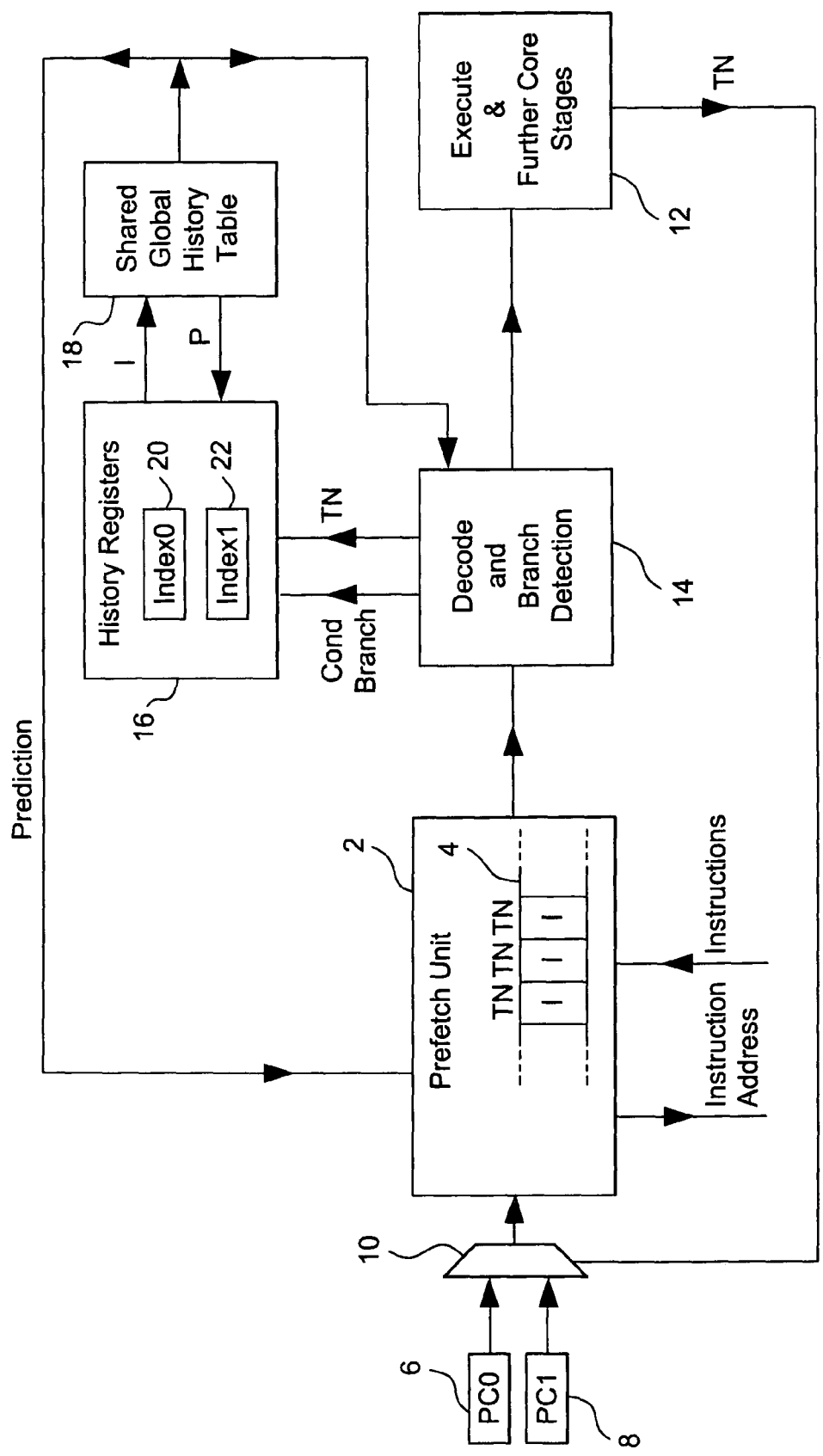
FIG. 2 schematically illustrates a portion of a multithreaded processor having a shared global history table.

FIG. 2 schematically illustrates a portion of the instruction pipeline used within a multithreaded processor. It will be appreciated by those familiar with this technical field that a multithreaded processor will in practice contain many more functional elements. These functional elements are conventional and known to those in this technical field and accordingly will not be described further.

FIG. 2 shows a prefetch unit 2 which serves to fetch instructions to be executed from an instruction memory (not illustrated) using an instruction address with those instructions being returned and held within an instruction queue 4. The instruction address is generated using one of two program counters 6, 8 which are selected for use by a multiplexer 10. In this example, the processor supports two parallel program threads which are interleaved using the hardware scheduling mechanism provided in part by the multiplexer 10 and the program counters 6, 8 acting under control of a fedback thread selecting signal TN from the execute stage 12. When the execute stage 12 indicates that an instruction of a particular thread has completed execution, it signals this back to the multiplexer 10 which then selects the program counter of the other program thread to be used to fetch the next instruction thereby effectively alternating the use of the program counters 6, 8 assuming that none of the instructions stall or is in some other way delayed. If one of the program threads is subject to such a delay, then the fedback thread selecting signal TN will indicate that program instructions from the non-stalled thread are to be selected by switching in the appropriate program counter 6, 8 for the non-stalled thread and using this to generated addresses to fetch further instructions. As illustrated in FIG. 2, a thread identifier accompanies the instructions within the instruction queue 4 so that the control logic, including the particular the hardware scheduling logic, can keep track of the threads from which each instruction has been taken and accordingly divide the processing resources of the system as desired between the threads.

Program instructions from the instruction queue 4 are passed to a decode and branch detection unit 14, which among its tasks serves to at least partially decode the instruction to identify conditional branch instructions. Such conditional branch instructions when identified trigger generation of a branch prediction from a branch prediction mechanism including amongst other items history registers 16 and a shared global history table 18.

As illustrated, the history registers 16 include separate branch history registers 20, 22 for each of the threads. A thread identifier TN from the decode and branch detection unit 14 is passed to the branch prediction mechanism 16, 18 and serves to select the appropriate branch history registers 20, 22 to be used to generate an index which looks up a prediction value within the shared global history table 18. This prediction value is fed back to the prefetch unit 2 in the normal fashion triggering a redirection of program flow (e.g. a taken branch) should that be required and the prediction made also accompanies the conditional branch instruction detected as it progresses further along the instruction pipeline (and in particular may be used when that conditional branch instruction is actually resolved to determine whether or not the prediction of its behaviour was or was not correct). Appropriate corrective action (such as partial pipeline flush) can be taken in the known way should the predicted branch behaviour turn out to be incorrect. The general aspects of the behaviour of such branch prediction mechanisms based upon branch history registers and global history tables will be known to those in this field and will not be described further.

Figure 3:
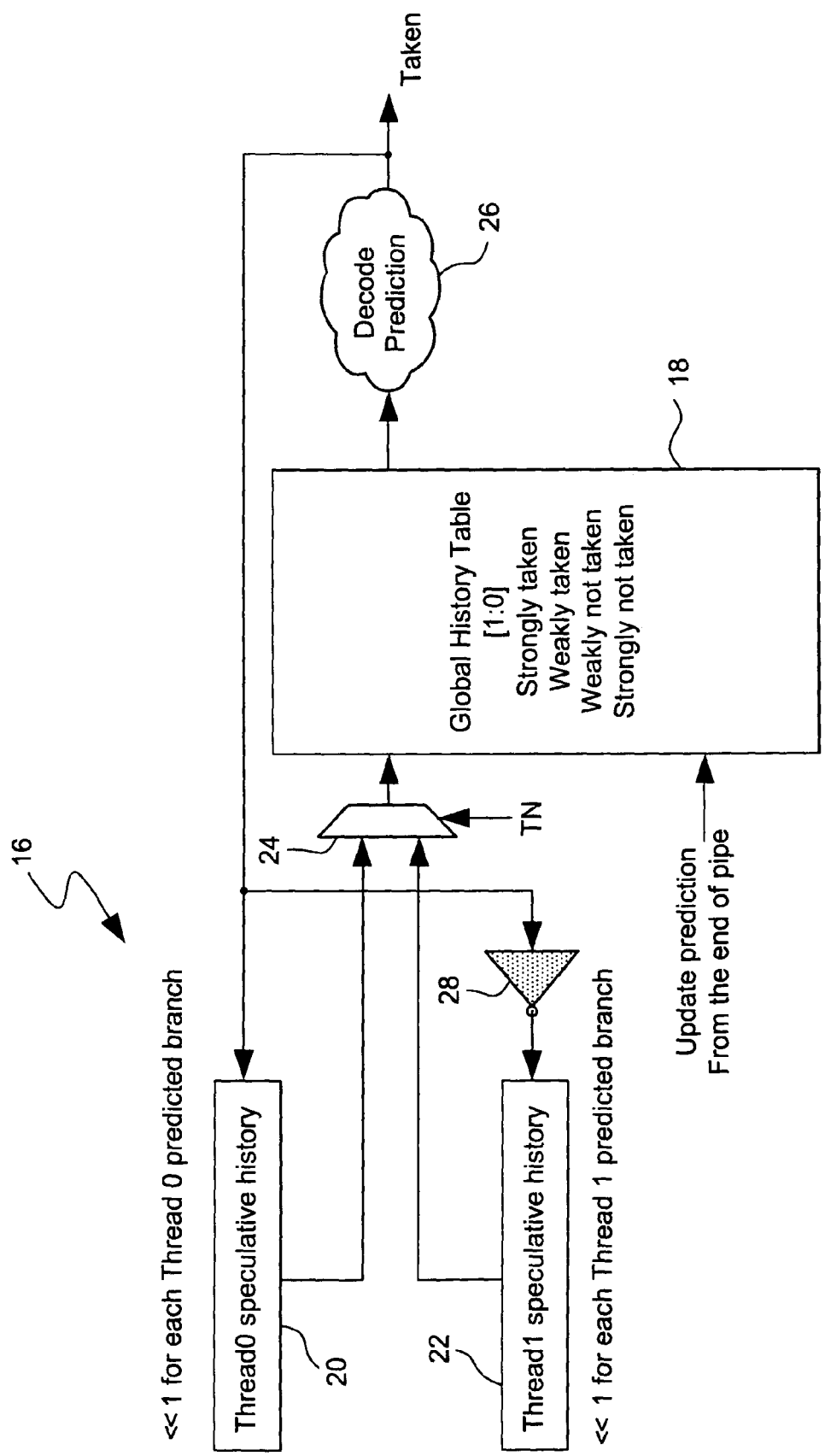
FIG. 3 illustrates a first example of a branch prediction mechanism including a shared global history table, two history registers and different mappings between preceding branch behaviour and the index value stored within those history registers.

FIG. 3 illustrates one example of a branch prediction mechanism in accordance with the present technique in more detail. As will be seen, two branch history registers 20, 22 are provided. A multiplexer 24, which is switched by a thread identifying signal TN for the conditional branch instruction detected by the decode and branch detection unit 14 is provided to select one of the prediction indexes stored within the branch history registers 20, 22. This index is used to address the shared global history table 18. The shared global history table 18 stores a prediction value in respect of each pattern of preceding branch behaviour which indicates one of: strongly taken, weakly taken, weakly not taken or strongly not taken. This is a 2-bit prediction value. This prediction value read from the shared global history table 18 is fed forward through decoding logic 26 and is output as either a taken or not taken signal and used to determine the behaviour of the prefetch unit 2 and other elements within the system in the conventional manner.

Returning to the branch prediction registers 20, 22 it will be seen that these are updated with each prediction made with a new bit value which is input to one end of these branch history registers 20, 22 as they are left shifted. The example of FIG. 3 uses different mappings between the preceding branch behaviour being represented and the prediction index being stored within the respective branch history registers 20, 22 by virtue of an inverter 28 which serves to invert the representation used for both taken and non-taken branches to be opposite for the respective branch history registers 20, 22. This is the simple example illustrated in FIG. 1. It will be seen that the mapping logic in this case comprises the inverter 28 and yet is able to produce the strong advantage of spreading out the use of storage locations within the global history table 18 which is shared by the two threads so that they are not competing for the same storage locations.

Figure 4:
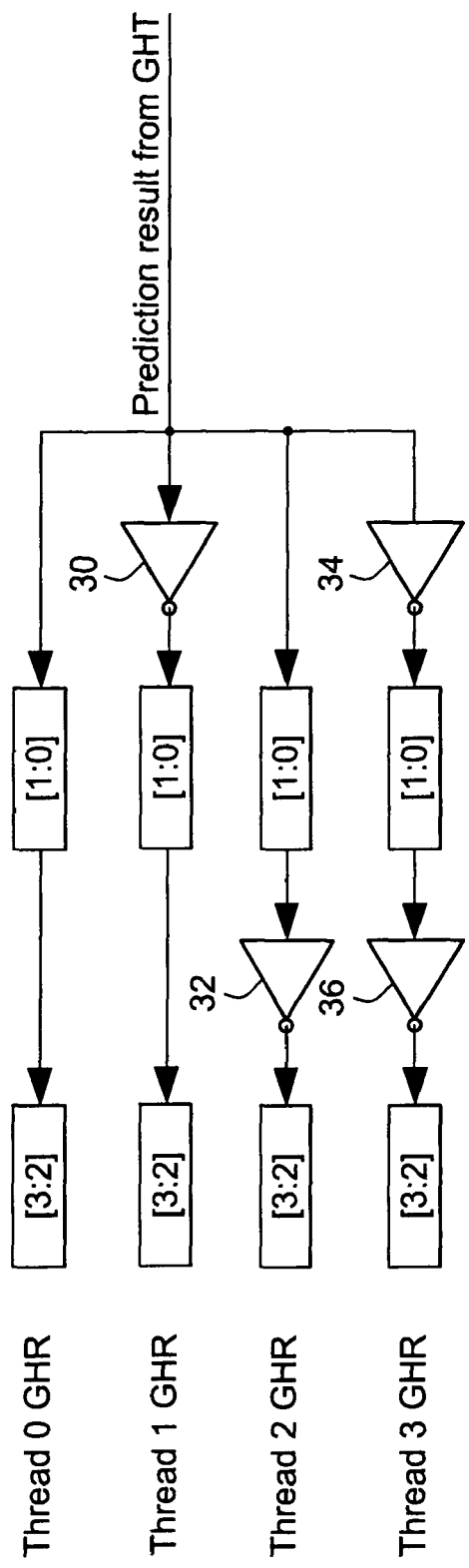
FIG. 4 illustrates a second example of a mapping between branch behaviour and index stored.

FIG. 4 illustrates an alternative mapping mechanism which may be employed when the processor supports four program threads executing in parallel. In this case, the branch history registers remain four bits in length, but each of these registers has an individual pattern of bit inversions applied to the way in which it stores a representation of the preceding branch behaviour. These individual bit inversion patterns as provided by the inverters 30, 32, 34, 36 have the effect that an individual branch behaviour pattern will result in a different prediction index when occurring in each of the different program threads. There remains a one-to-one mapping between preceding branch behaviour and prediction index within a given thread. These characteristics ensure that a thread does not compete within itself for storage locations for predictions and reduces the manner in which the threads compete between one another for such storage locations.

It will be appreciated that in practice the branch history registers will be longer, e.g. >8bits in length, but the principle of operation is unchanged. The patterns of preceding branch behaviour are able to be more specific and the shared global history to be larger.

Figure 5:
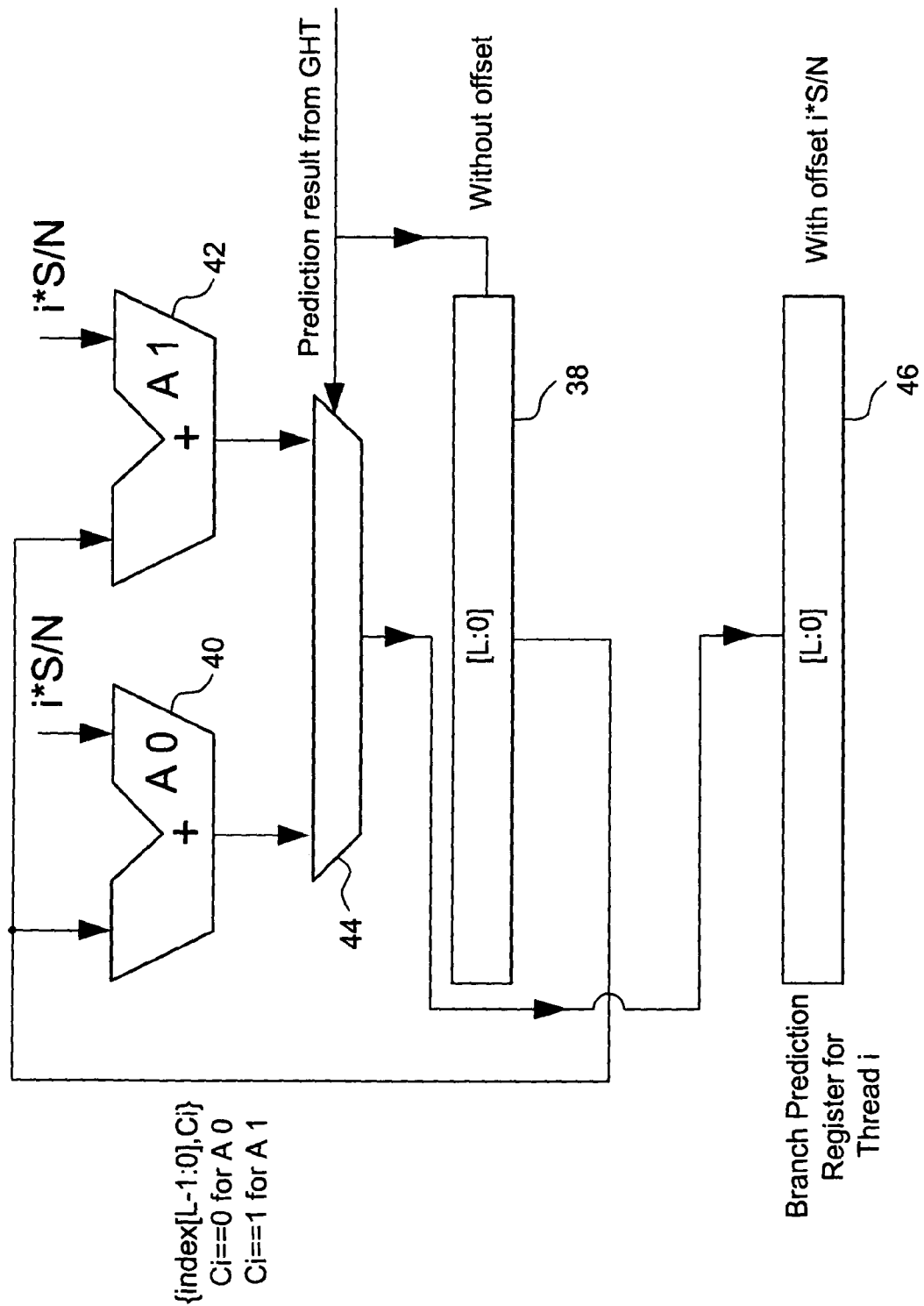
FIG. 5 illustrates a third example of a mapping between banch behaviour and index stored.

FIG. 5 illustrates a still further example of a mapping mechanism which may be used. This mapping mechanism may also be used when there are an odd number of program threads supported and is illustrated with a general history register length of L+1 bits. This mapping mechanism adds an offset value to the prediction index for each thread starting from a base prediction index stored within a base branch history register 38 to which the raw prediction indicating value taken from the output of the branch prediction mechanism is applied. The offset applied is chosen to equally space the prediction indicies generated for respective program threads for a given preceding branch behaviour evenly through the storage space of the shared global history register 18 by dividing the storage spaces within the global history table 18 by the number of threads N and multiplying this by an index i representing the number of the thread concerned. These offsets are supplied to one input of two adders 40, 42 which pre-calculate two new prediction values subject to the appropriate offset taking account of the latest new prediction result "0" for adder 40 and "1" for adder 42. The outputs from these adders 40, 42 are selected between by a multiplexer 44, which is also controlled by the new prediction value. The multiplexer output stored within the branch history register 46 corresponds to the particular thread with its individual offset.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    a multithreaded processor having a hardware scheduling mechanism for interleaving execution of program instructions from a plurality of program threads; and
    a branch prediction mechanism having:
        (i) a plurality of branch history registers each storing a prediction index that is a representation of taken or not taken preceding branch behaviour for a respective program thread of said plurality of program threads;
        (ii) a global history table shared between said plurality of program threads and having a plurality of storage locations storing predictions of branch behaviour, said plurality of storage locations being indexed in dependence upon a prediction index for a currently active program thread such that different program threads use the same storage locations; and
        (iii) mapping logic configured to provide different one-to-one mappings for different program threads between storage locations of predictions within said plurality of storage locations and preceding branch behaviour represented by respective prediction indices, wherein the same value of prediction index maps to different preceding branch behavior for each different program thread.

2. Apparatus as claimed in claim 1, wherein said mapping logic maps preceding branch behaviour into a different prediction index for each different program thread.

3. Apparatus as claimed in claim 2, wherein said mapping logic maps a given preceding branch behaviour into respective different prediction indices such that each prediction index has an individual pattern of bit inversions with respect to all other of said prediction indices.

4. Apparatus as claimed in claim 2, wherein said mapping logic adds a different offset to each prediction index stored in a respective one of said plurality of branch history registers.

5. A method of processing data, said method comprising the steps of:
    interleaving execution of program instructions from a plurality of program threads using a hardware scheduling mechanism controlling a multithreaded processor; and
    predicting branch behaviour by:
        (i) storing a prediction index that is a representation of taken or not taken preceding branch behaviour for a respective program thread of said plurality of program threads within a respective one of a plurality of branch history registers;
        (ii) storing predictions of branch behaviour within a global history table shared between said plurality of program threads and having a plurality of storage locations, said plurality of storage locations being indexed in dependence upon a prediction index for a currently active program thread such that different program threads use the same storage locations; and
        (iii) performing different one-to-one mappings for different program threads between storage locations of predictions within said plurality of storage locations and preceding branch behaviour represented by respective prediction indices, wherein the same value of prediction index maps to different preceding branch behavior for each different program thread.

6. A method as claimed in claim 5, wherein said mapping maps preceding branch behaviour into a different prediction index for each different program thread.

7. A method as claimed in claim 6, wherein said mapping maps a given preceding branch behaviour into respective different prediction indices such that each prediction index has an individual pattern of bit inversions with respect to all other of said prediction indices.

8. A method as claimed in claim 6, wherein said mapping adds a different offset to each prediction index stored in a respective one of said plurality of branch history registers.

9. Apparatus for processing data, said apparatus comprising:
    multithreaded processor means for processing, said multithreaded processor means having hardware scheduling means for interleaving execution of program instructions from a plurality of program threads; and
    branch prediction means for predicting branches, said branch prediction means having:
        (i) a plurality of branch history register means each for storing a prediction index that is a representation of taken or not taken preceding branch behaviour for a respective program thread of said plurality of program threads;
        (ii) a global history table means shared between said plurality of program threads and having a plurality of storage locations for storing predictions of branch behaviour, said plurality of storage locations being indexed in dependence upon a prediction index for a currently active program thread such that different program threads use the same storage locations; and
        (iii) mapping means for providing different one-to-one mappings for different program threads between storage locations of predictions within said plurality of storage locations and preceding branch behaviour represented by respective prediction indices, wherein the same value of prediction index maps to different preceding branch behavior for each different program thread.

* * * * *